United States Patent Office 2,813,819
Patented Nov. 19, 1957

2,813,819

HEXAALKYL (ETHYLENEIMINO THIOMETHYL-IDYNE) TRIPHOSPHONATE

Gail H. Birum, Dayton, Ohio, assignor to Monsanto Chemical Company, St. Louis, Mo., a corporation of Delaware No Drawing. Application May 18, 1956,
Serial No. 585,619

8 Claims. (Cl. 167—33)

The present invention relates to nitrogenous organic compounds of phosphorus and more particularly provides the hitherto unknown alkyl esters of (ethyleneiminothiomethylidyne) triphosphonic acid, the method of preparing the same, and insecticidal compositions comprising the new esters.

According to the invention, the presently provided compounds are prepared by the reaction of N-ethylenetrichloromethanesulfenamide with a trialkyl phosphite, substantially according to the scheme:

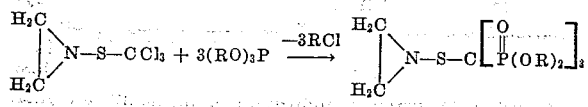

in which R is an alkyl radical of from 1 to 5 carbon atoms.

The N-ethylenetrichloromethanesulfenamide is readily obtained by the condensation of ethyleneimine with perchloromethyl mercaptan as disclosed in my copending application Serial No. 585,618, filed of even date.

Trialkyl phosphites which condense with the N-ethylenetrichloromethanesulfenamide according to the invention are the simple or mixed phosphites such as trimethyl, triethyl, tri-n-propyl, triisopropyl, tri-n-butyl, tri-n-amyl and triisoamyl phosphite, or dimethyl ethyl, diamyl n-propyl or tert-amyl isobutyl n-propyl phosphite. Triphosphonates provided by the present invention are, e. g., hexamethyl, hexaethyl, hexa-n-propyl, hexaisobutyl, hex-n-amyl, triethyl, trimethyl, tri-n-butyl trimethyl or di-n-amyl diethyl di-n-propyl (ethyleneiminothiomethylidyne)-triphosphonate.

Reaction of the trialkyl phosphite with the N-ethylenetrichloromethanesulfenamide takes place easily by heating the two reactants at a temperature of, say, from 60° C. to 160° C., depending upon the nature of the individual phosphite used as well as upon the other reaction conditions employed, e. g., reactant quantities, speed of stirring, facilities for removing by-product alkyl chloride, etc. Since the reaction takes place by condensation of one mole of the amide with three moles of the phosphite, these reactants are advantageously used in stoichiometric proportions. However, since either unreacted amide or unreacted phosphite is readily separable from the triphosphonate product, an excess of either reactant may be used. Stirring is advantageously employed so that smooth reaction, as a consequence of thorough intermingling of the reactants, is thus brought about; however, stirring is not essential. Removal of by-product alkyl chloride as it is formed may be expedient but also not essential. This may be conveniently effected by operating at reduced pressure.

The reaction may be conducted in the presence or absence of an extraneous diluent or solvent which is inert during the reaction conditions; however, if such a solvent or diluent be employed, it should have a boiling point which is higher than that of either of the two reactants or the by-product alkyl chloride.

The hexaalkyl (ethyleneiminothiomethylidyne)triphosphonate is readily recovered from the reaction product by known isolating procedures, e. g., by solvent extraction or distillation. Generally if the reactants have been used in stoichiometric proportions and adequate provisions for constant removal of alkyl halide have been employed, the product is the substantially pure triphosphonate which can be employed for many purposes directly, without further purification.

The present hexaalkyl (ethyleneiminothiomethylidyne) triphosphonates are stable well-characterized compounds which may be employed for a variety of industrial and agricultural purposes, e. g., as lubricant additives, textile treating agents and as biological toxicants. As will be shown hereinafter, the present triphosphonates are particularly useful as insecticides being effective against insect pests either by contact, residual or systemic action when employed in very small concentrations. Because they do not injure plant life at insecticidal concentrations the hexaalkyl (ethyleneiminomethylidyne)triphosphonates are, especially valuable as the active ingredients of agricultural insecticide compositions.

The present invention is further illustrated but not limited by the following examples:

Example 1

N-Ethylenetrichloromethanesulfenamide (19.2 g., 0.1 mole) was cooled in ice and stirred as 66.4 g. (0.4 mole) of freshly fractionated triethyl phosphite was added during a time of about 12 minutes. The resulting solution was heated to about 110° C. and ethyl chloride began to collect in the trap attached to the condenser with which the reaction vessel was equipped. The temperature of the reaction mixture was brought to 140° C., at which point the reaction mixture began to darken. It was then cooled to 30° C., put under water pump vacuum, and heated to 50° C. At this point 16.2 g. of ethyl chloride had collected in the trap. The theoretical quantity for replacement of all three chlorine atoms from the amide is 19.2 g. Distillation of the reaction mixture to remove material boiling below 72° C./0.1 mm. gave as residue 48.1 g. of the dark red hexaethyl (ethyleneiminothiomethylidyne)-triphosphonate, $n_D^{25}$ 1.4682 and analyzing as follows:

| | Found | Calcd. for $C_{15}H_{31}O_9P_3S$ |
|---|---|---|
| Percent N | 2.35 | 2.82 |
| Percent P | 17.69 | 18.7 |
| Percent S | 5.63 | 6.45 |

Example 2

This example describes insecticidal evaluation of the hexaethyl (ethyleneiminothiomethylidyne)triphosphonate of Example 1.

Contact, residual, and systemic insecticidal effect of said triphosphonate against mites and chewing larvae was determined as follows:

An 0.1% emulsion of the triphosphonate was prepared by pipetting 0.1 ml. of the chemical into a 200 cc. flask, adding 0.2 ml. of "Emulsifier L" (a mixture of a long chained alkylbenzenesulfonate and an ether of a polyalkyleneglycol with a higher alcohol), and then diluting the contents of the flask with 100 cc. of tap water. Some of the 0.1% emulsion thus obtained was then further diluted with water to give an emulsion having an 0.0016% concentration of the triphosphonate.

Potted bean plants which had been previously infested with the two-spotted mite *Tetranychus telarius* were sprayed to run-off with the 0.0016% emulsion and then placed in the greenhouse under ordinary conditions of sunlight and watering. Observation of the sprayed plants at the end of 48 hours showed a 100% kill of mobile and resting stages of the mite and at the end of one week, a 97% kill of eggs and a 97% residual activity.

The residual action of said triphosphonate against larvae was determined by dipping an uninfested Wood's prolifice lima bean leaf into the 0.1% emulsion of the triphosphonate, allowing the leaves to drain and the emulsion to dry thereon, and then placing ten second instar Mexican bean beetle larvae thereon. The leaf was then stored in the insectary at 77° F. for 48 hours. At the end of that time a 100% kill of the larvae was observed.

The systemic action of said triphosphonate was also determined. In this test, plants are allowed to absorb the chemical through excised stems so that a stomach poison activity may be produced in the leaves of the plants by translocation and/or by metabolization.

Two long cut stems of Wood's prolific lima beans with cotyledons and cotyledon leaves, were inserted into test tubes containing 0.004% and 0.001% respectively of the hexaethyl (ethyleneiminothiomethylidyne) triphosphonate of Example 1 in the form of emulsions prepared by further dilution, with tap water, of the 0.1% emulsion. The test tubes were set in an incubation chamber for 72 hours, at the end of which time bean leaves were excised with petioles of from two to three inches in length and placed in water-filled test tubes. The leaves were then respectively infested with ten second instar Mexican bean beetle larvae (*Epilachna varivestic* Mulsant), with mobile stages of the two-spotted spider mite (*Tetranychus telarius*) and with ten mature cotton aphids (*Aphis gossypii* Glover). The assemblies were then stored for 48 hours at a temperature of 77° F. Observation of the leaves at the end of that time showed a 100% kill of the bean beetle larvae, the mites and the aphids.

The compounds of the invention are effective toxicants for the control of a wide variety of insects, and may suitably be used as agricultural chemicals for the control of insects on growing crops. Illustrations of important species of mites which attack crops and against which the present compounds may be used are the citrus red mite, the citrus rust mite, the two-spotted spider mite, the apple bud mite, etc. Other species of insects against which the compounds of the invention may be used in agricultural practice include sucking insects such as the pea aphid or the chrysanthemum aphid, as well as the chewing larvae or beetles, e. g., the Colorado potato beetle, moths, e. g., the codling moth, etc.

Only very low concentrations of the triphosphonates of this invention are needed to produce insecticidal effect, e. g., from 0.0005% to 2.0%, depending upon the severity of the infection, the insect species, and the choice of the triphosphonate. For the convenient application of these low quantities, suitably the active ingredient is applied in an inert carrier. Oil-in-water emulsions of these toxicants obtained by preparing an emulsified concentrate thereof and then diluting with water, are highly suitable compositions for application to crops and have been found to possess unexpectedly superior insecticidal activity. By "oil" is meant any organic liquid which is immiscible with water. The triphosphonates may also be applied as dusts, i. e., in admixture with powdered or granular inert carriers such as talc, pumice or bentonite. Compositions comprising the present triphosphonates may also, if desired, include other active pesticides, such as fungicides, etc.

What I claim is:

1. Hexaalkyl (ethyleneiminothiomethylidyne)triphosphonates of the formula

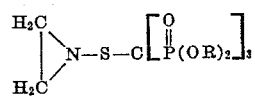

in which R is an alkyl radical of from 1 to 5 carbon atoms.

2. Hexaethyl (ethyleneiminothiomethylidyne)triphosphonate.

3. The method which comprises heating N-ethylenetrichloromethanesulfenamide with a trialkyl phosphite having from 1 to 5 carbon atoms in the alkyl radical and recovering from the resulting reaction product a hexaalkyl (ethyleneiminothiomethylidyne)triphosphonate having from 1 to 5 carbon atoms in the alkyl radical.

4. The method which comprises contacting N-ethylenetrichloromethanesulfenamide with triethyl phosphite and recovering hexaethyl (ethyleneiminothiomethylidyne)triphosphonate from the resulting reaction product.

5. An insecticidal composition comprising an inert carrier and as the essential active ingredient a hexaalkyl (ethyleneiminothiomethylidyne)triphosphonate having from 1 to 5 carbon atoms in the alkyl radical.

6. An insecticidal composition comprising an inert carrier and hexaethyl (ethyleneiminothiomethylidyne)triphosphonate as the essential active ingredient.

7. The method of destroying insect pests which comprises exposing said insects to a toxic quantity of an insecticidal composition comprising, as the essential active ingredient, a hexaalkyl (ethyleneiminothiomethylidyne) triphosphonate having from 1 to 5 carbon atoms in the alkyl radical.

8. The method of destroying insect pests which comprises exposing said insects to a toxic quantity of an insecticidal composition comprising hexaethyl (ethyleneiminothiomethylidyne)triphosphonate as the essential active ingredient.

References Cited in the file of this patent
UNITED STATES PATENTS
2,553,770    Kittleson _____ May 22, 1951